United States Patent [19]

Michelet et al.

[11] 4,407,567
[45] Oct. 4, 1983

[54] OBJECTIVE HAVING A VARIABLE FOCAL LENGTH

[75] Inventors: Guy A. Michelet, Paris; Georges G. Bret, Verrieres, both of France

[73] Assignee: Quantel S.A., Orsay, France

[21] Appl. No.: 32,932

[22] Filed: Apr. 24, 1979

[30] Foreign Application Priority Data

May 5, 1978 [FR] France .................. 78 13395

[51] Int. Cl.³ ............................................ G02B 15/00
[52] U.S. Cl. .................................. 350/423; 350/294; 350/295; 350/419; 350/442
[58] Field of Search .............. 350/179, 180, 186, 187, 350/184, 255, 295, 294, 419, 423, 442

[56] References Cited

U.S. PATENT DOCUMENTS

| | | | |
|---|---|---|---|
| 3,161,718 | 12/1964 | DeLuca | 350/180 |
| 3,299,368 | 1/1967 | Klebba | 350/295 |
| 3,614,456 | 10/1971 | Hamisch | 350/255 |
| 3,876,875 | 4/1975 | Velzel | 350/295 |
| 4,128,309 | 12/1978 | Lehureau et al. | 350/295 |

FOREIGN PATENT DOCUMENTS

| | | | |
|---|---|---|---|
| 2389143 | 12/1978 | France | 350/295 |
| 2389144 | 12/1978 | France | 350/180 |

*Primary Examiner*—F. L. Evans
*Attorney, Agent, or Firm*—Holman & Stern

[57] ABSTRACT

The optical device comprises at least two optical elements ($M_1$, $M_2$; $L_1$, $L_2$, $L_3$; $L_1$, $M_2$) which are of variable focal length and include multilayer structures, at least one source of voltage (47) for the multilayer structures and electronic control means for controlling the voltage applied to the respective multilayer structures of the optical elements of variable focal length as a function of the magnification desired for the optical device.

16 Claims, 16 Drawing Figures

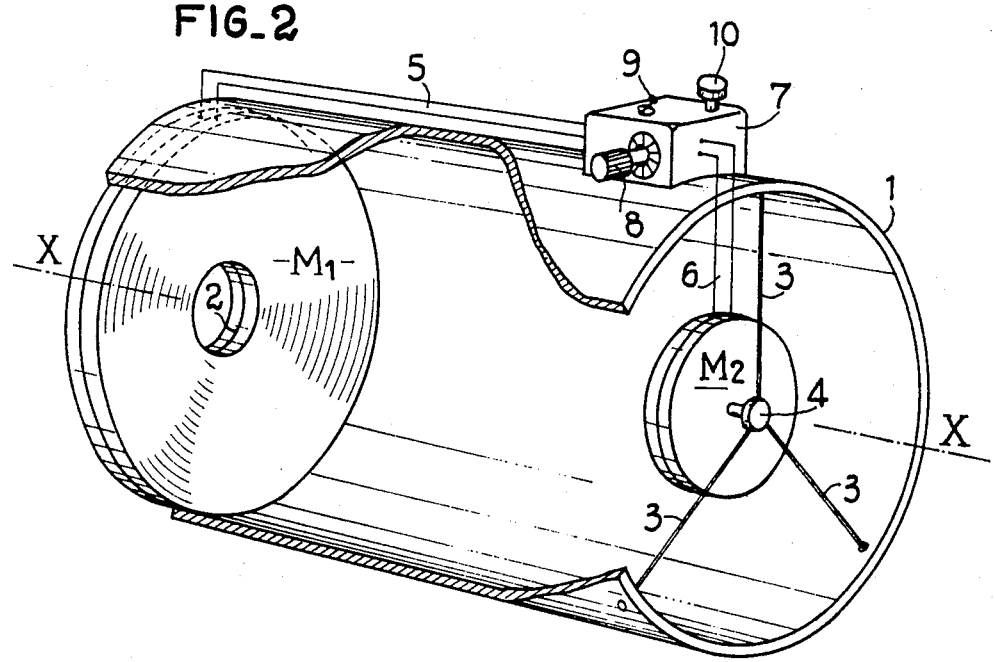
FIG_2
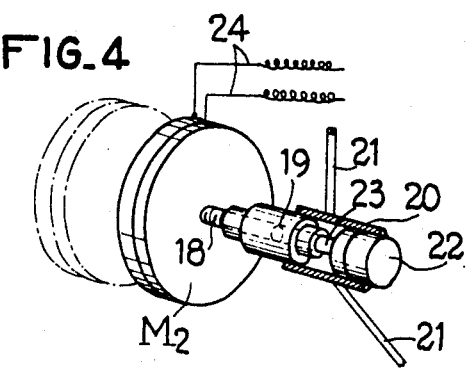
FIG_4
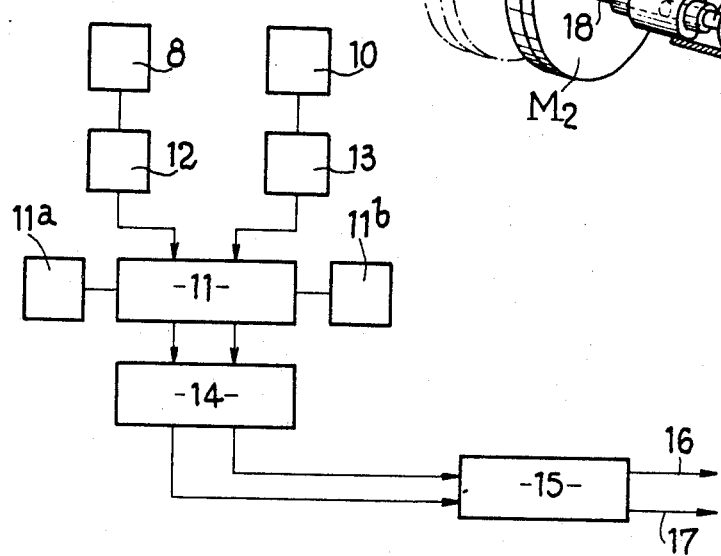
FIG_3

FIG._5
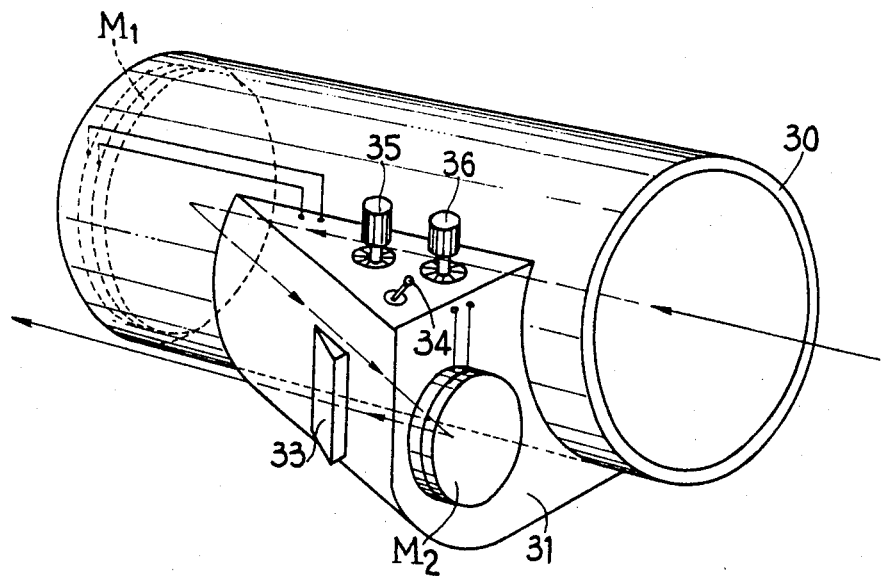
FIG._6
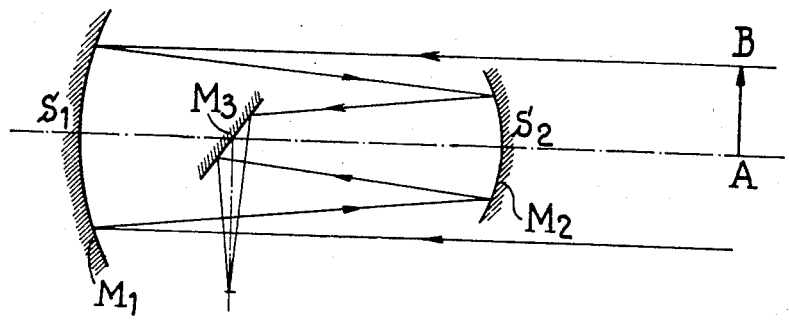

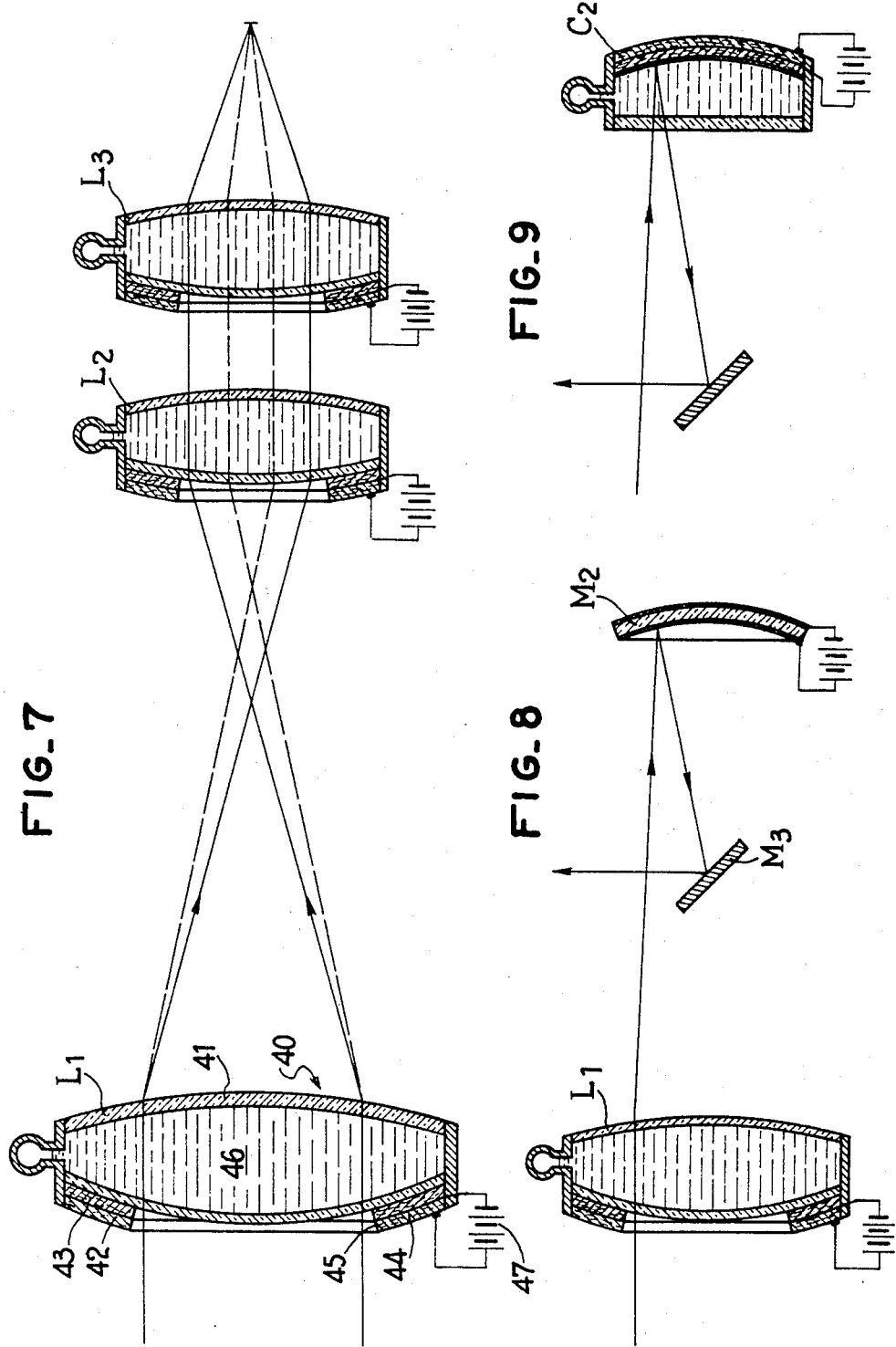

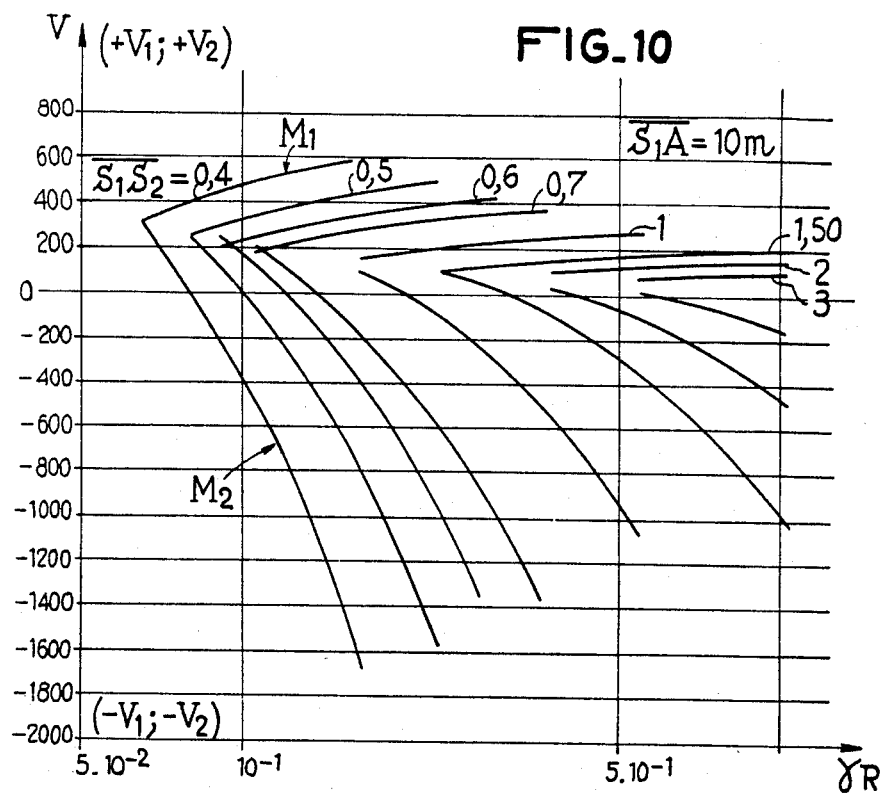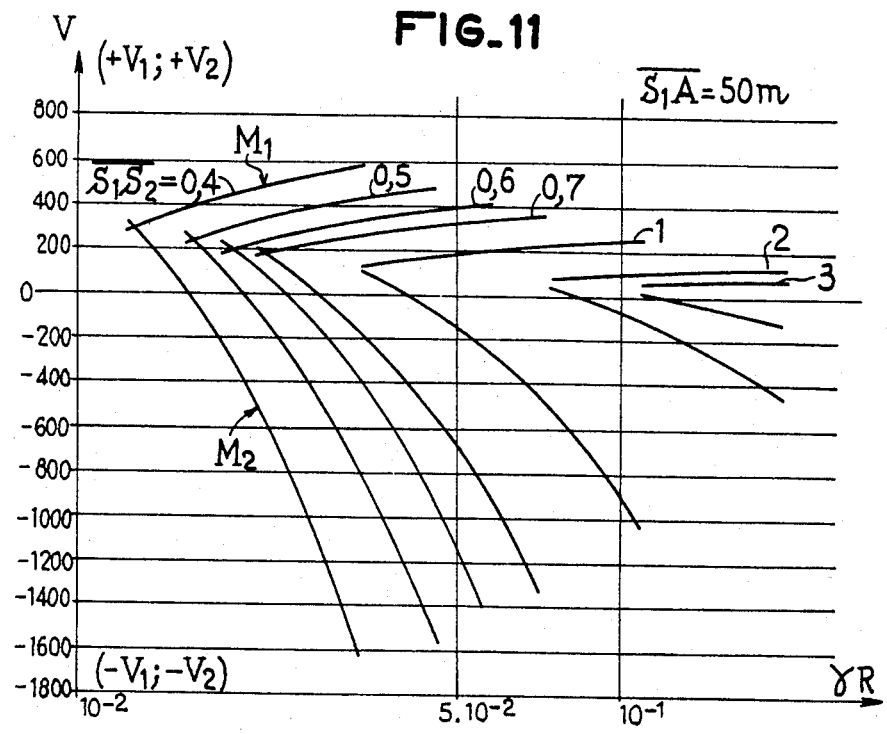

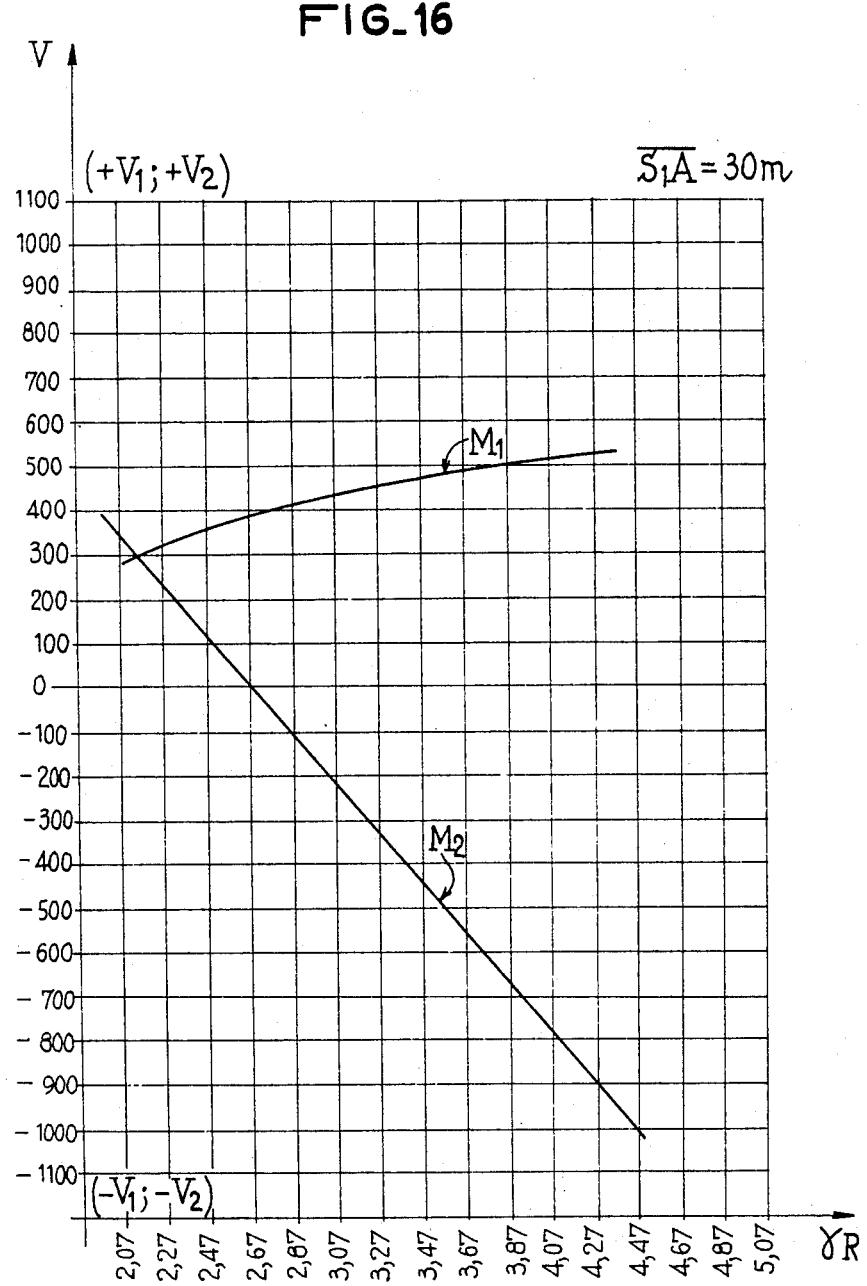

OBJECTIVE HAVING A VARIABLE FOCAL LENGTH

BRIEF SUMMARY OF THE INVENTION

The present invention relates to optical systems having a variable focal length and more particularly, but not exclusively, relates to optical devices having a variable focal length commonly termed "zoom".

These optical devices are optical complexes which comprise both convergent dioptres and divergent dioptres whose curvatures are determined by an initial machining.

In order to obtain variations in the focal length of such optical complexes, certain dioptres must be shifted with respect to others which are maintained fixed.

In such dioptric complexes it is very difficult to avoid aberrations of chromatism, stigmatism and sphericity for the entire range of variation of the focal length.

Moreover, conventional optical devices having a variable focal length employ optical elements such as lenses the manufacture of which requires the use of an elaborate technique which renders the optical devices expensive.

An object of the invention is to overcome the aforementioned drawbacks by providing an optical device having a variable focal length which is simple in construction and very cheap and yet has performances comparable to those of conventional optical devices.

According to the invention, there is provided an optical device having a variable focal length comprising at least two optical elements having a variable focal length comprising piezoelectric multilayer structures, at least one source for supplying voltage to said multilayer structures and electronic means for controlling the supply voltages for the respective multilayer structures of the elements of variable focal length as a function of the desired magnification of said optical device.

According to a particular feature of the invention, the two optical elements of variable focal length are formed by two mirrors of variable focal length.

According to another feature of the invention, the two elements of variable focal length are formed by two lenses of variable focal length.

According to another feature of the invention, the optical elements of variable focal length comprise a mirror or a catadioptric system having a variable focal length and a lens of variable focal length.

According to a further feature of the invention, the elements of variable focal length of the optical device are either fixed or movable with respect to each other.

Further features of the invention will be apparent from the ensuing description.

BRIEF DESCRIPTION OF THE SEVERAL VIEWS OF THE DRAWING

In the accompanying drawings, given solely by way of example:

FIG. 2 is a perspective view, with a part cut away, of a first embodiment of an optical device having a variable focal length according to the invention;

FIG. 3 is a block diagram of the electronic means controlling the optical device of FIG. 4;

FIG. 4 is a partial perspective view of the means for axially displacing one of the optical elements which may be included in the device having a variable focal length of FIG. 2;

FIG. 5 is a perspective view of another embodiment of the device having a variable focal length according to the invention;

FIG. 6 is an optical diagram of another type of optical device;

FIG. 7 is a diagrammatic view of an optical device having a variable focal length according to the invention comprising lenses of variable focal length;

FIG. 8 is a diagrammatic view of an optical device having a variable focal length comprising a lens of variable focal length and a mirror of variable focal length;

FIG. 9 is a partial view of a modification including a catadioptric system of the device of FIG. 8;

FIGS. 10 to 13 show the curves of the voltages which must be applied to the optical elements of an optical device having a variable focal length comprising two mirrors, as a function of the desired magnification, in respect of mirrors having a predetermined thickness and in respect of various distances between the observed object and the front element of the device;

FIG. 16 shows curves similar to those of FIGS. 10 to 13 representing the response of an optical device having a variable focal length, plotted on a paper having linear graduations and showing the simple relations between the excitation voltage and the resulting magnification $\gamma R$.

DETAILED DESCRIPTION

Figure 1:
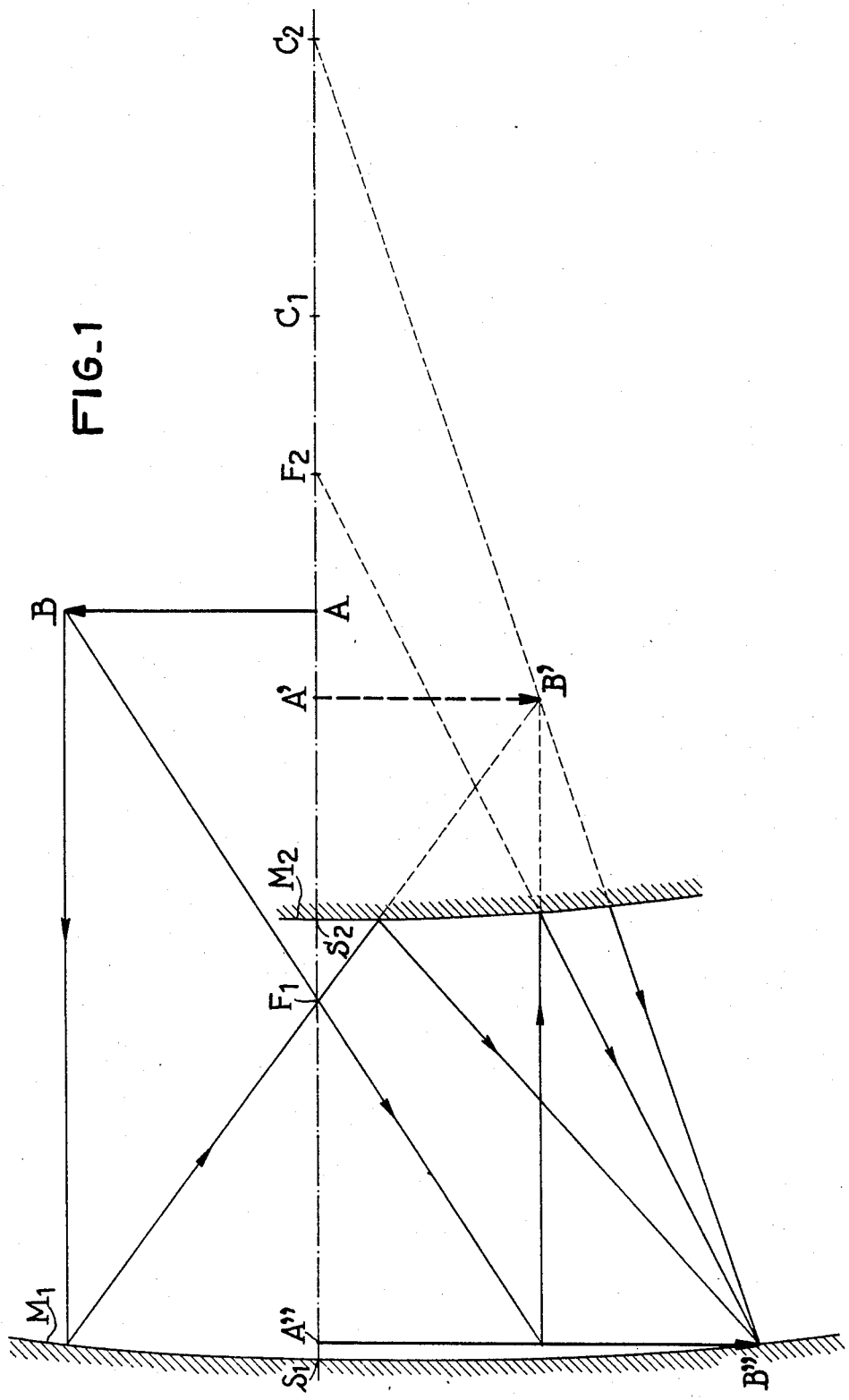
FIG. 1 is a diagrammatic view of the principle of an optical device having a variable focal length according to the invention.

In FIG. 1, the invention is considered to be applied to an optical device having a variable focal length comprising two mirrors $M_1$ and $M_2$ having apices $S_1$ and $S_2$ respectively. The centres of curvature and the focal points of the mirrors $M_1$ and $M_2$ are respectively designated by the references $C_1$, $F_1$ and $C_2$, $F_2$. $S_1$, $S_2$ is the distance between the spices of the mirrors $M_1$ and $M_2$, $S_1A$ is the position of the object relative to the mirror $M_1$ measured from the apex thereof, AB is the object to be observed, A'B' is the image given by the mirror $M_1$ of the object AB and A"B" is the image of the object AB given by the device according to the invention. $|\gamma_1|$ is the modulus of transverse magnification given by the mirror $M_1$ $$|\gamma_1| = \left| \frac{-\overline{S_1A'}}{\overline{S_1A}} \right|$$

$|\gamma_2|$ is the modulus of the transverse magnification given by the mirror $M_2$ $$|\gamma_2| = \left| \frac{-\overline{S_1A''}}{\overline{S_1A'}} \right|$$

$|\gamma_R|$ is the modulus of the final magnification of the optical organization having a variable focal length.

$$|\gamma_R|=|\gamma_1|\cdot|\gamma_2|$$

The mirrors $M_1$ and $M_2$ of the optical device having a variable focal length of FIG. 1 are mirrors of variable focal lengths of the type described in copending U.S. patent applications Ser. No. 896,081 filed on Apr. 13, 1978 by the Applicants, now abandoned and Continuation Application thereof Ser. No. 253,079, filed Apr. 10, 1981.

As described in the aforementioned applications, these mirrors each comprise a multilayer structure at least one of the constituents of which is made from a piezoelectric material. An outer face of the multilayer structure carries the reflecting surface of the mirror and the multilayer structure has a voltage applied thereto by a source of dc voltage.

In the diagram of FIG. 1, it will be seen that the image plane of the optical device having a variable focal length according to the invention is located at the apex $S_1$ of the mirror $M_1$.

By varying the curvatures of the mirrors $M_1$ and $M_2$ in a suitable manner and by maintaining the distance between the object plane AB and the image plane A'B' at a constant value, the transverse magnification of the optical device may be varied. The curvature of the mirrors $M_1$ and $M_2$ is varied by varying the voltages which are respectively applied thereto by their respective sources.

The optical device having a variable focal length shown in FIG. 2 comprises a tubular mount 1 at one end of which is disposed a first mirror $M_1$ having a variable focal length and provided with a central orifice 2 for forming the image given by the device. At the opposite end of the mount 1 is disposed a second mirror $M_2$ having a smaller diameter than the mirror $M_1$ and fixed to be coaxial with the latter by means of rods 3 which are arranged at 180° to one another and fixed in the mount 1 and in a member 4 which is rigid with the non-reflecting face of the mirror $M_2$.

The mirrors $M_1$ and $M_2$ are respectively connected by conductors 5 and 6 to a control box 7 containing a high tension supply source for delivering from for example a small battery of 1.5 volts (not shown) a dc voltage the absolute value of which may vary from 0 to 1100 V. The box 7 also contains electronic control means which will be described hereinafter and are adapted to apply to the two mirrors $M_1$ and $M_2$ respective voltages the values of which are coordinated in order to obtain given magnifications of the optical device. The box 7 has a regulating knob 8 for regulating the focal length of the optical device, an on-off knob 9 and a focusing knob 10.

The electronic control means contained in the box 7 are shown in FIG. 3. They comprise mainly a microcomputer 11 including a microprocessor and having an input connected to the knob 8 regulating the magnification of the optical device through a "zoom" effect control circuit 12. Another input of the microprocessor 11 is connected to the focusing knob 10 through a focusing control circuit 13. The microprocessor comprises two data outputs connected, through an interface circuit 14, in two inputs of a dc high-tension source 15 which comprises two outputs 16 and 17 adapted to be respectively connected to the mirrors $M_1$ and $M_2$ so as to apply thereto voltages $B_1$ and $B_2$ corresponding to the desired magnifications.

The circuit of FIG. 3 comprises a device 11a for displaying the focal distance and a device 11b for displaying the distance of the object. Both these devices are connected to the microprocessor 11.

The display devices are advantageously formed by liquid crystal digital display devices for example of the nematic type.

In the embodiment shown in FIG. 2, the two mirrors $M_1$ and $M_2$ are fixed relative to each other. However, at least one of the mirrors may be made axially movable inside the mount 1.

FIG. 4 is a partial view of an embodiment of an optical device having an element of variable focal length in which the mirror $M_2$ is rendered axially movable.

In this embodiment, the mirror $M_2$ is mounted on a shaft 18 which carries at its end a sleeve 19 which is slidably mounted in a sheath 20 carried by rods 21 and fixed to the mount of the device (not shown). For the large displacements of $M_2$ in the sleeve 20, there is provided a micromotor 22 whose output shaft 23 is screwthreaded and cooperates with an internal screw thread in the sleeve 19 so as to displace the latter axially and therefore displace the mirror $M_2$ between two end positions one of which is shown in dot-dash lines. The mirror $M_2$ is connected to a supply box (not shown) through extensible conductors 24.

For small displacements of the mirror $M_2$ and even for large displacements of a few tens of centimeters, the micromotor will be replaced by a stack of piezoelectric ceramics which are longitudinally displaced.

It can be seen that the optical device having a variable focal length shown in FIG. 2 is a device which operates on its optical axis XX.

The optical device having a variable focal length shown in FIG. 5 is a device which operates outside this axis. This device comprises, as before, a mount 30 of tubular shape at one end of which there is mounted a first mirror $M_1$ of variable focal length. The mount 30 has a hollow lateral projection defining a box or case 31 which is inclined relative to the mount 30 and has, at the end thereof opposed to the mirror $M_1$, the second mirror $M_2$ of the device.

Formed in a lateral face of the case 31 is a window 33 provided for the exit of the light reflected by the mirror $M_2$ and permitting the formation of the final image given by the optical device outside the mount of the latter. The optical axes of the mirrors $M_1$ and $M_2$ are inclined at the same angle to the axis of the mount 30.

As in the embodiment shown in FIG. 2, the device of FIG. 5 comprises means for controlling the supply of voltage to the mirrors $M_1$ and $M_2$ and disposed inside the lateral case 31 which also carries an on-off knob 34, a knob 35 for regulating the "zoom" effect and a knob 36 for focusing on the object to be observed.

In the embodiment shown in FIG. 5, the output beam is parallel to the optical axis of the mirror $M_1$, but it will be understood that the direction of this beam may be different. Thus, as can be seen in FIG. 6, the device having a variable focal length comprises, in addition to two mirrors $M_1$ and $M_2$ of variable focal length, a planar mirror $M_3$ for reflecting the light coming from the mirror $M_2$ in a direction perpendicular to the optical axis of the system. Such a device also operates outside the axis.

The device having a variable focal length shown in FIG. 7 does not have mirrors but lenses of variable focal length. In the presently-described embodiment, it comprises three lenses, $L_1$, $L_2$ and $L_3$ each of which has a chamber or vessel 40 having at least one wall 41 of transparent material and a wall 42 opposed to the transparent wall 41 which is formed by a plate of flexible transparent material 43 on which a piezoelectric multilayer structure 44 is adhered, this structure being provided with an opning 45 for the passage of the light in the central part thereof surrounding the optical axis of the system.

The chamber 40 is filled with an index-adapting medium 46. The multilayer structure 44 has voltage applied thereto by a source of voltage 7.

A lens of this type is described in copending U.S. patent application Ser. No. 896,079 filed on Apr. 13, 1978 by one of the joint applicants, now U.S. Pat. No. 4,289,379, issued Sept. 15, 1981. It will be understood that the sources of voltage for the lenses $L_1$, $L_2$ and $L_3$ are connected to electronic supply control means which are adapted to supply respective voltages thereto which correspond to the curvatures which must be imparted to their multilayer structure so as to attain the magnification desired for the optical device.

The optical device having a variable focal length shown in FIG. 8 comprises a lens $L_1$ of variable focal length of the type described above and a mirror $M_2$ of variable focal length which is placed on the optical axis of the lens $L_1$, there being a planar mirror $M_3$ disposed on the path of the beams reflected by the mirror $M_2$ so as to form the image in a plane perpendicular to the optical axis of the latter. It will be understood that the lens $L_1$ and the mirror $M_2$ in this embodiment are elements of a type similar to that of the elements employed in the preceding embodiment. Consequently, each thereof has a piezoelectric multilayer structure for modifying their curvature, this multilayer structure being supplied with voltage by an associated source of voltage. In the embodiments of FIGS. 7 and 8, the sources of voltage are shown as being distinct sources of voltage, but it will be understood that there may be employed a source of voltage which is common to all the optical elements and has as many outputs as there are desired voltage values, this source being controlled by suitable electronic control means similar to the means described with reference to FIG. 3.

FIG. 9 is a partial view of an optical device having a variable focal length similar to that of FIG. 8 but in which the mirror $M_2$ of variable focal length is replaced by a catadioptric system $C_2$ of variable focal length of the type described in the above referred to copending application Ser. No. 896,079 filed on Apr. 13, 1978 and related to the other patent application mentioned before. Moreover, the device of FIG. 9 is similar to that of FIG. 8 and therefore will not be described in more detail.

It is also possible to contemplate the construction of optical device having a variable focal length which only comprise catadioptric systems of variable focal length or catadioptric systems and mirrors of variable focal length.

FIGS. 10 to 13 show curves of voltages applied to the mirrors of variable focal length of an optical device having a variable focal length such as that shown in FIG. 2, in respect of a given mirror thickness and in respect of different distances between the object to be observed and the device of the invention. These curves are plotted on a semi-logarithmic paper, the scale of the abscissae, corresponding to the magnifications, being logarithmic whereas the scale of the ordinates, corresponding to the supply voltages, is linear.

The curves in question were drawn up in accordance with a computer program based on calculations made under Gauss conditions, the relations adapted being the relations termed Chasles' relations in geometric optics.

With reference in particular to FIG. 10, the curves shown therein have been drawn up for a distance between the mirror $M_1$ and the object, $S_1A=10$ meters, the distance $S_1 S_2$ between the apices of the mirrors $M_1$ and $M_2$ being taken as the parameter.

The values of the distances $S_1 S_2$ are: 0.4; 0.5; 0.6; 0.7; 1; 1.5; 2 and 3.

The supply voltages $V_1$ and $V_2$ of the mirrors $M_1$ and $M_2$ vary between about $+600$ V and $-1600$ V, whereas the corresponding magnifications vary between $5\times10^{-2}$ and 1.

The curves of FIG. 10 have been drawn up for mirrors $M_1$ and $M_2$ which have zero curvature when their respective supply voltages $V_1$ and $V_2$ are equal to 0.

Figure 12:
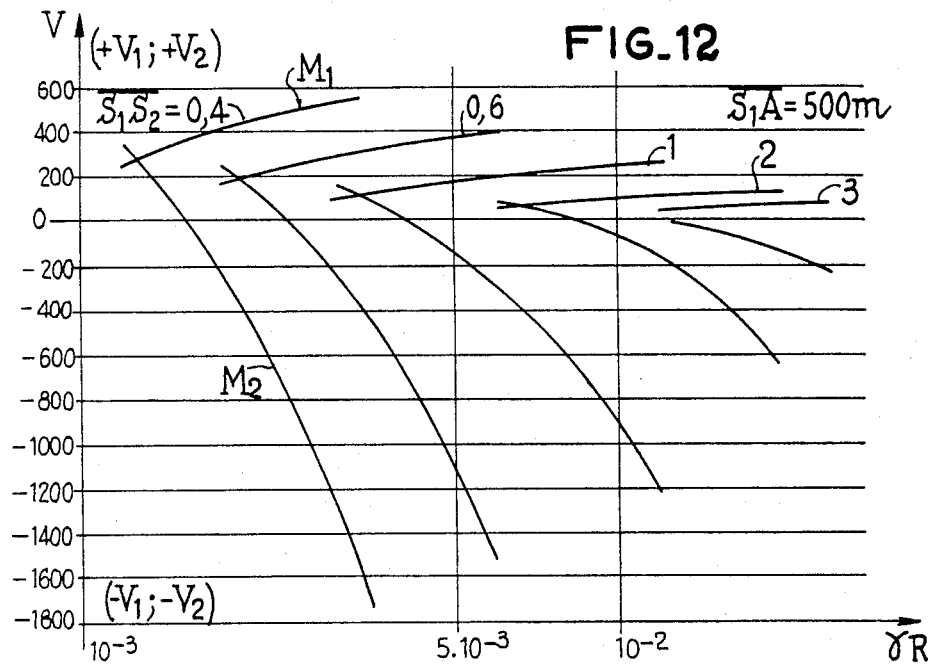
Figure 13:
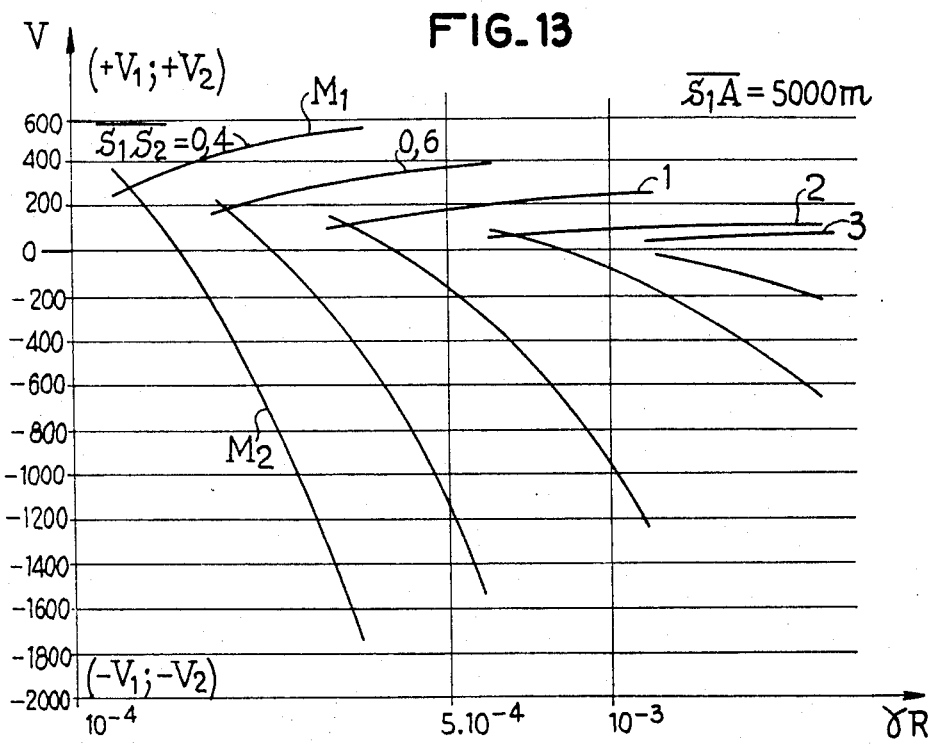

It can be seen from these curves that it is easy to determine the respective supply voltages of the mirrors $M_1$ and $M_2$ for a desired magnification $\gamma_R$, for a given distance $S_1 S_2$ between the mirrors and for a distance between the object and the mirror $M_1$ equal to 10 meters. The curves of FIGS. 11, 12 and 13 are similar to those of FIG. 10, but they have been drawn up for distances $S_1A$ between the object to be observed and the first mirror $M_1$ respectively equal to 50, 500 and 5000 meters. They are read in the same way as the curves of FIG. 10.

A full study of these four families of curves reveals that the greater the distance between the object and the first mirror $M_1$, the smaller the range of variation of the resulting magnification for similar variations in the supply of the voltages applied to the two mirrors, with the same values of distances $S_1$, $S_2$ taken as a parameter.

Figure 14:
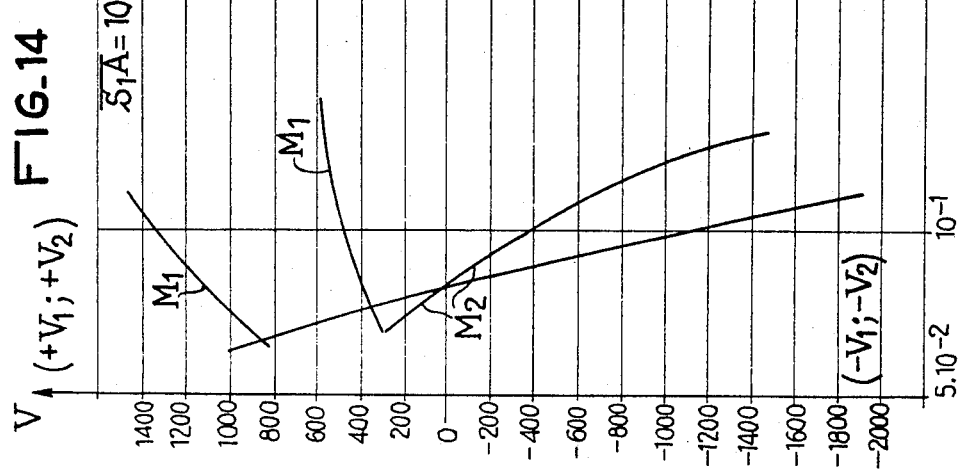
FIG. 14 shows curves similar to the preceding curves but in respect of mirrors having two different thicknesses.

The curves of FIG. 14 represent the supply voltages $V_1$, $V_2$ of the mirrors $M_1$ and $M_2$ of variable focal length having a variable focal length in respect to two different mirror thicknesses, the distance $S_1A$ between the object and the mirror $M_1$ and the distance $S_1 S_2$ between the apices of the two mirrors being constant. In the particular case of FIG. 14, the distance $S_1A$ is equal to 10 meters, whereas the distance $S_1 S_2$ between the mirrors $M_1$ and $M_2$ is equal to 0.4 meter. The curves whose point of intersection is the highest in FIG. 14 correspond to mirrors having a thickness of $10^3$ meters, whereas the curves whose point of intersection is located below the first-mentioned intersection correspond to mirrors having a thickness of $6\times10^{-4}$ meters.

It can be seen from the curves of FIG. 14 that the voltage range required to obtain a given magnification variation decreases with decrease in the thickness of the mirrors.

Figure 15:
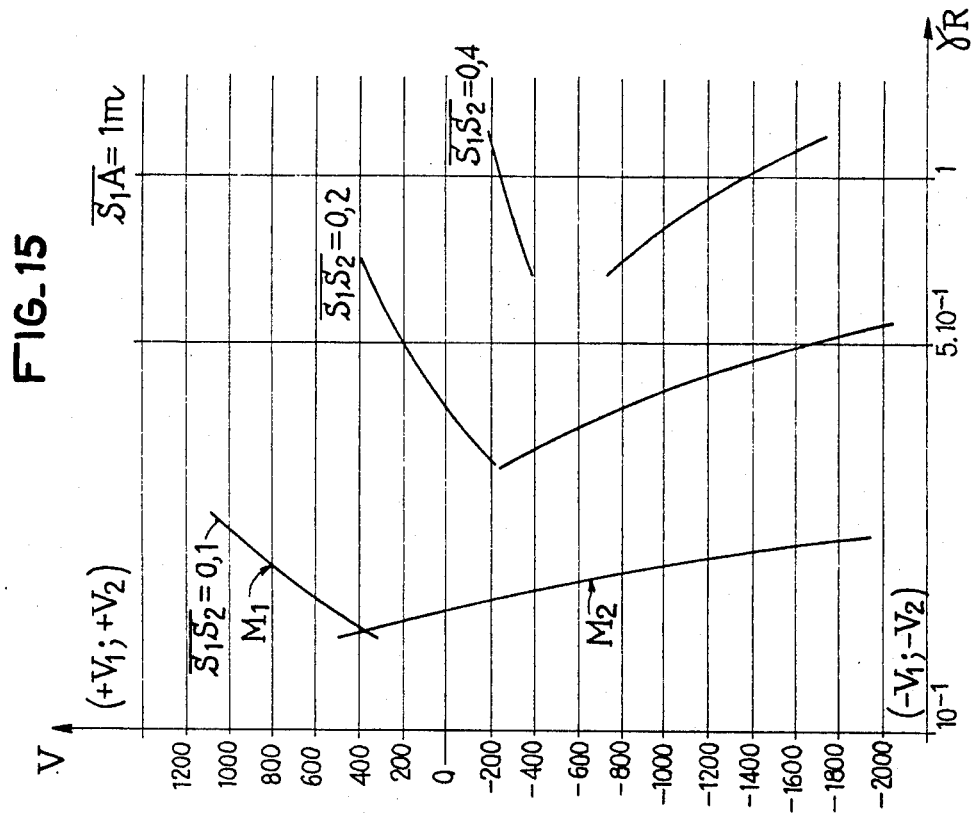
FIG. 15 shows curves similar to the preceding curves in respect of an optical device having a variable focal length one of the mirrors of which has a non-zero radius of curvature in the unexcited state.

FIG. 15 shows curves similar to the curves shown in FIGS. 10 to 13, but these curves are obtained from an optical device having a variable focal length whose mirror $M_1$ is preformed in such manner as to have a radius of curvature of 0.60 meter for a supply voltage $V_1$ equal to 0 across its terminals. The distance $S_1A$ between the object and the first mirror $M_1$ is equal to 1 meter, and the distance $S_1 S_2$ between the apices of the mirrors $M_1$ and $M_2$ is again taken as a parameter. The curve of FIG. 16 is a curve similar to that of FIGS. 10 to 13 but plotted on a millimeter paper the abscissa and ordinate scales of which are linear. This is a curve drawn up for a distance $S_1A$ between the object and the first mirror $M_1$ having a variable focal length equal to 30 meters and for a distance $S_1 S_2$ between the apices of the mirrors $M_1$ and $M_2$ equal to 0.4 meter. The linearity of the variation of the supply voltage of the mirror $M_2$ as a function of the resulting magnification can be seen in the graph of FIG. 16. This linearity is a property of particular interest since a linear variation is easy to achieve by means of an electronic circuit.

Indeed, the supply voltage of the mirror $M_2$ is related to the resulting magnification $\gamma_R$ by the relation $V_2 \alpha b \times \gamma_R$, in which b is an algebraic coefficient.

As concerns the supply voltage $V_1$ of the mirror $M_1$, it is given by the relation $$V_1 \alpha \sqrt{\frac{\gamma_R}{a}}$$

in which a is an algebraic coefficient. This is consequently a simple function.

It is known that the focal length of the optical device and its magnification are related in a quasi-linear manner. The following table gives, for a certain number of values $S_1A$ of distances between the object and the first mirror $M_1$ of an objective according to the invention—the distances $S_1 S_2$ between the two mirrors $M_1$ and $M_2$ being taken either as a fixed parameter or as a variable parameter—the ratio between the maximum and minimum focal distances of as a function of the supply voltages $V_1$ and $V_2$ applied to the mirrors $M_1$ and $M_2$.

In this table, it is clear that it is of particular interest to vary the supply voltages $V_1$ and $V_2$ of the mirrors having a variable focal length and the distance between the mirrors $M_1$ and $M_2$.

The various embodiments of optical devices having variable focal lengths just described have the following advantages over the systems of the prior art. They are formed by particularly simple optical combinations. They permit a perfect focusing in a continuous manner in the fixed image plane in the course of variation of the image and object focal lengths of the combination, for a fixed object.

By applying non-uniformly and in a judicious manner the supply voltages to each of the mirrors or other optical elements forming part of the construction of the optical devices having a variable focal length for fixed image and object planes, longitudinal and transverse aberrations are perfectly mastered. The curvature 1/R of a mirror of variable focal length is related to the electric field E applied thereto by the relation:

$$1/R \approx K^{(1)} \times E + K^{(2)} \times E^2 + \ldots + K^{(n)} E^n$$

in which R is the radius of curvature of the mirror and $K^{(n)}$ depends on the thickness of the mirror, on its type of assembly having one or two ceramics, on the piezoelectric constants, on its diameter, on the moduli of elasticity of the materials, on the quality of the sintering of the ceramics, etc.

The term of order 1 of this relation gives the expression of the mean curvature of the mirror.

On the other hand, terms of an order higher than 1 permit the correction of the aberrations. Indeed, the correction of the aberrations is effected by locally varying the curvature of the mirror by a very small variation of the electric field for the considered zone of aberration, this variation being of an order higher than 1 relative to the mean electric field of the mirror.

As has been seen in the various embodiments described herein, the optical devices may be made to operate either outside the optical axis or on this axis.

A device having a variable focal length according to the invention is light and cheap and may be very easily controlled with a very low consumption of energy which practically corresponds to the leak current of a capacitor.

In the described and illustrated embodiments, the piezoelectric materials employed for the construction of the multilayer structure forming part of the optical element of variable focal length have a piezoelectric constant $d_{31}$ between $150 \times 10^{-12}$ and $200 \times 10^{-12}$ m. $V^{-1}$.

Although the curve given by way of example have been plotted for optical devices constructed by means of mirrors of variable focal length, similar curves may be obtained for optical devices whose construction comprise lenses, catadioptric systems and combinations of these elements with mirrors.

| | | For → −1000 V < $V_1$ and $V_2$ < +1000 V | | | | | |
|---|---|---|---|---|---|---|---|
| | | Focal distance ($S_1S_2$ fixed parameter) | | F. max / F. min ($S_1S_2$ fixed param.) | Focal distance ($S_1S_2$ variable parameter) | | F.max / F. min ($S_1S_2$ variable param.) |
| | $S_1A$ | $S_1S_2$ | F. min # | F. max # | | F. min # | F. max # | |
| Curvatures $M_1$ and $M_2$ zero for $V_1$ and $V_2$ zero | 10 | 0.4 | 0.59 | 1.2 | 2.03 | 0.59 | | |
| | | 0.7 | 0.96 | 2.18 | 2.27 | | | 8.61 |
| | | 1.5 | 1.89 | 5.08 | 2.69 | | 5.08 | |
| | 30 | 0.4 | 0.61 | 1.24 | 2.04 | 0.61 | | |
| | | 0.7 | 1.1 | 2.6 | 2.36 | | | |
| | | 1 | 1.55 | 4.35 | 2.81 | | | 11.16 |
| | | 2 | 3.19 | 6.82 | 2.14 | | 6.82 | |
| | 50 | 0.4 | 0.62 | 1.27 | 2.05 | 0.62 | | |
| | | 0.7 | 1.04 | 2.8 | 2.69 | | | |
| | | 1 | 1.61 | 4.92 | 3.06 | | | 13.44 |
| | | 2 | 3.49 | 8.33 | 2.39 | | 8.33 | |
| | 500 | 0.4 | 0.6 | 1.33 | 2.22 | 0.6 | | |
| | | 0.6 | 0.92 | 2.4 | 2.61 | | | |
| | | 1 | 1.5 | 5.6 | 3.73 | | | 20 |
| | | 2 | 2.99 | 12 | 4.01 | | 12 | |
| | 5000 | 0.4 | 0.6 | 1.34 | 2.23 | 0.6 | | |
| | | 0.6 | 0.93 | 2.42 | 2.6 | | | |
| | | 1 | 1.51 | 5.4 | 3.58 | | | 28.3 |
| | | 2 | 3.03 | 17 | 5.61 | | 1.7 | |
| Curvature of $M_1$ = 0.60 m for $V_1$ = 0 | 1 | 0.1 | 0.14 | 0.19 | 1.36 | 0.14 | | |
| | | 0.2 | 0.23 | 0.36 | 1.57 | | | 5.4 |
| | | 0.4 | 0.4 | 0.76 | 1.9 | | 0.76 | |

-continued

| | | For → −1000 V < $V_1$ and $V_2$ < +1000 V | | | | | |
|---|---|---|---|---|---|---|---|
| | | Focal distance ($S_1S_2$ fixed parameter) | | $\dfrac{F.\,max}{F.\,min}$ | Focal distance ($S_1S_2$ variable parameter) | | $\dfrac{F.\,max}{F.\,min}$ |
| $S_1A$ | $S_1S_2$ | F. min # | F. max # | ($S_1S_2$ fixed param.) | F. min # | F. max # | ($S_1S_2$ variable param.) |
| 5 | 0.1 | 0.17 | 0.195 | 1.15 | 0.17 | | |
| | 0.2 | 0.29 | 0.37 | 1.28 | | 0.37 | 2.18 |
| 500 | 0.1 | 0.17 | 0.2 | 1.18 | 0.17 | | |
| | 0.2 | 0.3 | 0.4 | 1.33 | | 0.4 | 2.35 |

Having now described our invention what we claim as new and desire to secure by Letters Patent is:

1. An optical device having a variable focal length comprising at least two separate and independent optical elements which are of variable focal length spaced apart at a distance sufficient to produce an optical instrument having variable magnification and comprise piezoelectric multilayer structures, at least one electric supply connected to the multilayer structures, and electronic means for controlling the voltage supplied to the respective multilayer structures of the elements of variable focal length as a function of the magnification desired for said optical device.

2. An optical device as claimed in claim 1, wherein said optical elements of variable focal length comprise mirrors of variable focal length.

3. An optical device as claimed in claim 1, wherein said optical elements comprise lenses of variable focal length.

4. An optical device as claimed in claim 1, wherein said optical elements comprise a lens of variable focal length and a mirror of variable focal length.

5. An optical device as claimed in claim 1, wherein said optical elements comprise a lens of variable focal length and a catadioptric system of variable focal length.

6. An optical device as claimed in any one of the claims 1 to 5, wherein said optical elements of variable focal length are mounted at a fixed distance apart.

7. An optical device as claimed in any one of the claims 1 to 5, wherein said optical elements of variable focal length are mounted so that their distance apart is adjustable.

8. An optical device as claimed in claim 2, wherein the image of the object furnished by said device is formed on the optical axis of the device in the plane of the apex of one of said mirrors of variable focal length, and said one mirror comprises in its centre region a window surrounding the optical axis thereof.

9. An optical device as claimed in claim 2, wherein the image of the object furnished by the device is formed outside the optical axis of the device and the device further comprises a supplementary mirror for deviating in a predetermined direction the rays coming from said mirrors of variable focal length.

10. An optical device as claimed in claim 2, wherein the optical axes of said mirrors of variable focal length are inclined at an angle relative to the means direction of propagation of the light that said device receives.

11. An optical device as claimed in any one of the claims 1 to 5 and 8 to 10, wherein said electronic means for controlling the voltages supplied to the respective multilayer structures of the elements of variable focal length comprise a microcomputer including a microprocessor and adapted to furnish output control data applied to said supply as a function of control signals for adjusting the magnification and for focusing applied to the corresponding inputs of the microcomputer, a circuit controlling the adjustment of the focal length and a circuit controlling the focusing supplying said signals.

12. An optical device as claimed in any one of the claims 1 to 5 and 8 to 10, comprising a mount receiving said optical elements of variable focal length and a case mounted on the mount and receiving the electronic control means.

13. An optical device as claimed in claim 7 wherein a means is provided for adjusting the distance between said optical elements.

14. An optical device as claimed in any one of claims 1, 2, 4 or 5 wherein said optical elements are supported in a mount so that their distance apart is adjustable, and an adjusting means is provided comprising one of said optical elements being mounted on the shaft of a micromotor, said micromotor being supported on the mount, and means to operate said micromotor to move said shaft and thereby said at least one optical element with respect to the other optical element.

15. An optical device as claimed in claim 14 wherein said micromotor is supported by a plurality of rods extending radially from the central axis of each of the optical elements to be moved, said rods being attached at their outer ends to said mount.

16. An opticl device as claimed in claim 10 wherein one of said mirrors is mounted within a tubular mount with its optical axis at an angle with respect to the central axis of said tubular mount, a hollow case mounted in the outer surface of said tubular member, an aperture through the wall of said tubular mount within said case so that light from said first mirror passes therethrough, a second mirror mounted on said case to receive said light and redirect it at a predetermined angle.

* * * * *